United States Patent [19]

Kemeny

[11] 4,433,607

[45] Feb. 28, 1984

[54] SWITCH FOR VERY LARGE DC CURRENTS

[75] Inventor: George A. Kemeny, Wilkins Township, Allegheny County, Pa.

[73] Assignee: Westinghouse Electric Corp., Pittsburgh, Pa.

[21] Appl. No.: 309,290

[22] Filed: Oct. 6, 1981

[51] Int. Cl.³ .......................... F41F 1/02; H02K 41/02

[52] U.S. Cl. ................................................ 89/8; 124/3

[58] Field of Search ..................... 89/8; 124/3; 310/10, 310/13; 200/144 R, 144 A, 144 AP, 148 C, 147 R, 148 G

[56] References Cited

U.S. PATENT DOCUMENTS

| | | | |
|---|---|---|---|
| 1,001,975 | 8/1911 | Murgas | 200/144 R |
| 1,097,871 | 5/1914 | Murphy | 200/144 R |
| 1,116,871 | 11/1914 | Bliss | 200/144 R |
| 2,660,647 | 11/1953 | Rawlins | 200/144 R |
| 3,071,666 | 1/1963 | Ellsworth et al. | 200/144 R |
| 3,978,300 | 8/1974 | Slade | 200/144 R |
| 4,052,576 | 10/1977 | Smith | 200/147 R |
| 4,329,971 | 5/1982 | Kemeny et al. | 89/8 |
| 4,347,463 | 8/1982 | Kemeny et al. | 89/8 |
| 4,355,561 | 10/1982 | Kemeny et al. | 89/8 |
| 4,369,692 | 1/1983 | Kemeny | 89/8 |

OTHER PUBLICATIONS

S 2049 0046 IEEE Trans. of Magnetics, vol. Mag-18, No. 1, (1/82), Deis et al., pp. 16-22.

EP-T12 (3/72) Acceleration of Macroparticles and a Hypervelocity Electromagnetic Accelerator, Barber et al., pp. 1-198.

*Primary Examiner*—Sal Cangialosi
*Attorney, Agent, or Firm*—R. P. Lenart

[57] ABSTRACT

An elongated armature can be moved rectilinearly but is preferably rotated between a first position in which it bridges the gap between two parallel rails to short circuit a very large DC current applied to one end of the rails and a second position where electrical contact with one rail is interrupted. Interruption of the circuit through the armature generates a massive arc which is driven by electromagnetic forces toward the second ends of the rails. Means are also provided for rapidly increasing the voltage across switch terminals to either more rapidly commutate the current into a secondary circuit and/or to more rapidly cause arc extinction. The switch is particularly useful for projectile launcher systems where the armature can be continuously rotated for burst firing. Preferably, the launcher rails are longitudinal extensions of the switch rails so that the arc initially produced by switch opening or armature rotation can be used directly in arc driving of projectiles. Various means are disclosed for providing an initial acceleration to the arc driven projectile to minimize rail damage which would be caused by slowing down of the arc by an initially stationary or slow moving projectile.

24 Claims, 14 Drawing Figures

SWITCH FOR VERY LARGE DC CURRENTS

BACKGROUND OF THE INVENTION

1. Field of the Invention

This invention relates to switches for switching very large currents and has particular application to switches for switching very large DC currents into parallel rails such as are used in the electromagnetic propulsion of projectiles.

2. Description of the Prior Art

In switching very large DC currents, on the order of several hundred thousand amperes, the current interruption or commutation is not instantaneous resulting in the generation of very large arc. In order to maintain themselves, these arcs require a gaseous material and will vaporize anything available, including the switch contacts, to generate the necessary conducing medium. Without proper design, these arcs can cause very considerable damage to the switching device, thereby significantly reducing its useful life.

One application where very high DC currents must be switched is in electromagnetic propulsion of projectiles such as devices commonly known as parallel rail launchers or rail guns. In the rail gun, a projectile is placed in the gap between two conductive rails rigidly fixed in spaced parallel relationship to each other. When a very high DC current is injected into the fixed rails, the electromagnetic field generated drives the projectile down the rails and out of the end of the gun at very high velocities, which can be in the order of several thousand meters per second.

Presently, the very high DC currents are commutated into the rail gun by a rail switch, which is in effect a second rail gun, one rail of which has a first portion connected to one rail of the gun at the breech and a second portion electrically isolated from the first and connected to the breech end of the second gun rail. The switch armature is in the form of an electrically conductive projectile which spans the gap between the switch rails. The armature is restrained at the energized end of the switch rails, but when released is driven down the switch rails at high velocity by the electromagnetic field generated by the current to be switched. As the armature passes from the first to the second portion of the switch rail connected to the gun rails, the current is commutated into the gun rails. Typically, the armature of the rail switch is made up of wafers of conductive material bent so as to supply a spring force against the switch rails for better sliding electrical contact. Early work on such a rail switch is discussed in the thesis of J. P. Barber entitled "The Acceleration of Macroparticles and a Hypervelocity Electromagnetic Accelerator" published by the Australian National University (ANU), March 1972. A modified form of such a rail switch is disclosed in my copending, commonly owned U.S. patent application Ser. No. 100,302 filed Dec. 4, 1979 now U.S. Pat. No. 4,369,692. These rail switches provide for rapid commutation of the current to the gun rails which reduces switch damage due to arcing.

In the ANU rail switch, an insulating insert is provided in the gap between the first and second portions of the switch rail connected to the rail gun in order to start the arc that is essentially unavoidably present during commutation. In my modification of the basic rail switch, an insulating insert is also provided in the other switch rail adjacent the first insert so that two arcs are generated in series as the armature passes over the inserts. This doubles the total arc voltage resulting in a more rapidly completed commutation of the current. My modified rail switch further extends the life of the rail switch by providing an improved sliding armature and by providing arc resistant inserts in the switch rails at their juncture with the resistive inserts where the arcs are struck.

After the current has been commutated to the gun rails, the high speed armature of the rail switch, which can easily reach a speed of 50 meters per second, must be stopped, returned to the starting position and restrained in preparation for the next firing. This is a limitation in rapid firing of the rail gun. In my copending application identified above, I have proposed a rail switch in which the rails form a circular path for the armature. While this shortens the distance that the armature must be moved for resetting, it still requires stopping the armature, repositioning it and restraining it.

In addition to the limitations of the rail switches in rapid firing, they are bulky and expensive. They require rails several meters long which must be precisely and rigidly held in place to resist the substantial forces tending to spread them apart, and the armatures have a limited life.

As an alternative to passing a large current through an electrical conductive projectile and accelerating the projectile through the magnetic forces created thereby, the projectile can be driven by an arc created in the rail gun behind the projectile. These prior art arc driving systems, such as those shown in my copending applications Ser. No. 116,118 filed Jan. 28, 1980 now U.S. Pat. No. 4,319,168 and Ser. No. 137,059 filed on Apr. 3, 1980 now U.S. Pat. No. 3,347,463 use a rail switch for commutating current into the rail gun and since the arcing which effects commutation of the current occurs in the switch, not the gun, a fuse type device at the rear of the projectile is required to initiate the desired propelling arc. The large current flowing through the fuse causes it to explode, thereby striking or initiating the arc or plasma which drives the projectile through the rail gun. Again, such an arrangement is quite suitable for single firings, but with rapid burst firing, the debris from many fuse explosions is likely to both impede fuse contact in subsequent firings and to finally restrict the rail bore to such an extent as to damage the projectile sealing faces. This, in turn, can lead to hot gases bypassing the projectile with the arc eventually leapfrogging the projectile and eliminating the projectile driving force.

SUMMARY OF THE INVENTION

According to the present invention, very large DC currents are commutated or interrupted by a switch which includes a pair of electrically conductive rails, preferably parallel, but at least extending generally in the same direction in a common plane with a gap in between. An armature, which may move rectilinearly but is preferably rotatable, is movable between a first position where it bridges the gap between the rails and thus carries the very large DC current applied to one end of the rails, and a second position in which contact with at least one of the rails is broken. The resultant interruption of the very large current through the armature generates an arc between the rails which is driven toward the second end of the rails by the electromagnetic forces present. Since the arc moves rapidly along the rails, arc damage is minimized although the rails can be provided with arc resistant surfaces to prolong their life even more. The rails may also be provided with resistive sections which increase arc voltage and thereby help to extinguish the arc or more rapidly commutate the current into a different circuit loop. Termination of the arcing can be further accelerated by providing insulated inserts in the rails following the resistive portions which elongate the arc and thereby raise the voltage needed to sustain it. Arc chutes can also be provided beyond the insulated section to cool the arc for more rapid extinguishment.

In the preferred form of the invention, the elongated armature is mounted between the switch rails for rotation about an axis perpendicular to the common plane of the rails. As the armature is rotated it makes and breaks contact with one of the rails. The other rail is curved in the common plane away from the first rail to form a recess for the armature. The recess is of such a depth that when the elongated armature is rotated parallel to the rails, it is spaced from the one rail by a distance sufficient to give the required voltage withstand capability and thus to prevent parasitic restriking of an arc in the switch. The ends of the armature and the rails have complementary arcuate surfaces with either the rails or the armature being provided with sliding contacts which improve electrical contact between the surfaces. Preferably, the contacts, in the form of sheets of resilient, electrical conductive material bent along an axis perpendicular to the common plane, are mounted on the rotating armature since arcing only occurs on one end of the armature at a time and, therefore, life of the contacts is substantially improved. The life of the contacts can be further improved by conducting the current from the armature to the second rail through the armature shaft so that the contacts on the end of the elongated armature are only subjected to any heating on every other firing.

The rotating armature is preferably provided with arc horns extending in a circumferential direction from both ends. If desired, insulators may be provided on either side of the elongated armature to form a cylindrical rotor.

Where the armature moves rectilinearly, preferably it makes and breaks contact with the one rail by moving in the common plane in and out of a recess in the other rail. This armature is also provided with an arc horn adjacent its free end along the side toward the second ends of the rails toward which the arc travels. Resilient contacts similar to those used on the rotating armature are provided between one rail and the free end of the rectilinearly movable armature. The contacts are set so that contact is progressively broken along the free edge of the armature in the direction of the arc horn.

While the rails of the switch are preferably parallel, they may have a portion adjacent the armature in which they converge toward each other to narrow the gap at the armature. This prevents damage to the end of the armature caused by the arc traveling over this surface to reach the rail. Such damage can also be precluded by lengthening the arc horns.

When the switch is used to commutate DC current into the rails of a parallel rail launcher or rail gun, each of the parallel gun rails is connected directly to one of the switch rails. Preferably, the rails of the gun are longitudinal extensions of the switch rails, or to say it another way, the switch rails are extended to form the launcher rails. This makes a very compact, efficient arrangement and is particularly suitable for arc driving of projectiles since the arc which is initiated by rotation of the armature is struck between the launcher rails themselves, behind the projectile, thereby eliminating the need for explosive fuses on the projectile as in the prior art.

In arc driving, it is desirable that the projectile be given an initial acceleration by suitable means so that it is already moving when the arc comes into contact with it. This initial acceleration can be provided by a pressurized gas injected between the rails behind the projectile. Synchronization of gas injection can be accomplished by a valve which is connected to or is an integral part of the rotating or oscillating armature. If a combustible gas is used, firing of an igniter plug is synchronized with movement of the switch armature. A caseless explosive attached to the rear of the projectile can also be ignited by such synchronized ignition with the projectiles being fed by a conventional magazine assembly. Initial projectile propulsion can also be effected by a diaphragm which, when struck by the arc, compresses a gas against the rear of the projectile. Alternatively, the diaphragm can act against a compressible member which transmits the accelerating force to the projectile. The projectile can also be accelerated initially by mechanical means. For instance, it can be inserted between the rails by a wheel rotating in a plane perpendicular to the common plane so that the projectile enters the gap between the rails at a velocity equal in magnitude to the peripheral speed of the wheel.

Arc driving with the present invention eliminates the need for the heavy conducting armature on the projectile and also the explosive fuse of the prior art, thus increasing the useful load. The rear of the projectile assembly, however, should be provided with a protective coating or layer to minimize arc damage. An ablative coating is particularly suitable. When a diaphragm is used, either with a compressible member or with trapped gas, it absorbs the heat from the arc and the projectile need only be electrically insulating, thereby further increasing the projectile useful payload.

BRIEF DESCRIPTION OF THE DRAWINGS

(FIGS. 11 and 12 are horizontal sections) of parts of rail gun assemblies according to the invention utilizing several different means for providing initial acceleration to arc driven projectiles.

DESCRIPTION OF THE PREFERRED EMBODIMENTS

Figure 1:
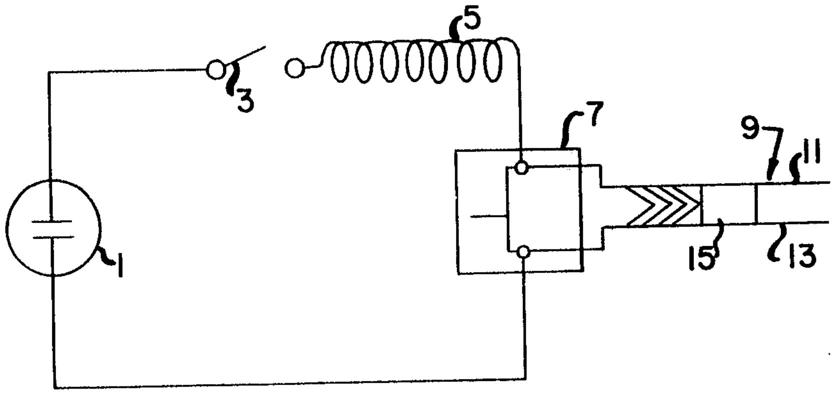
FIG. 1 is a schematic diagram of a rail gun system incorporating the present invention.

The invention will be described as applied to a system for electromagnetically accelerating projectiles; however, it is to be understood that it is also suitable for other applications in which large DC currents must be commutated or interrupted. FIG. 1 illustrates schematically a projectile launching system comprising a source capable of producing a large DC current such as a homopolar generator 1, a make switch 3, a large inductor 5, a firing switch 7 and a rail gun 9 including a pair of parallel, electrically conductive rails 11 and 13 and a projectile 15 slidably engaging the rails. With the make switch 3 closed, a very large DC current generated by the homopolar generator 1 is caused to flow through the inductor 5. At this point the firing switch 7 is in the position shown in FIG. 1 to short circuit the rail gun 9. When the gun is to be fired, the firing switch is opened to inject the very large DC current into the rails of the rail gun. The current either flows through a conductive section of the projectile or in the form of an arc or plasma between the rails behind the projectile. In either event, the electromagnetic field generated by this very large current creates a force tending to spread the rails apart and to propel the projectile down the rails. Since the rails are rigidly fixed in place, the projectile is driven down the rails and out of the end of the rail gun at a very high velocity. The firing switch is then returned to the position shown in FIG. 1 and a new projectile 15 is inserted between the rails in preparation for the next firing.

Figure 2:
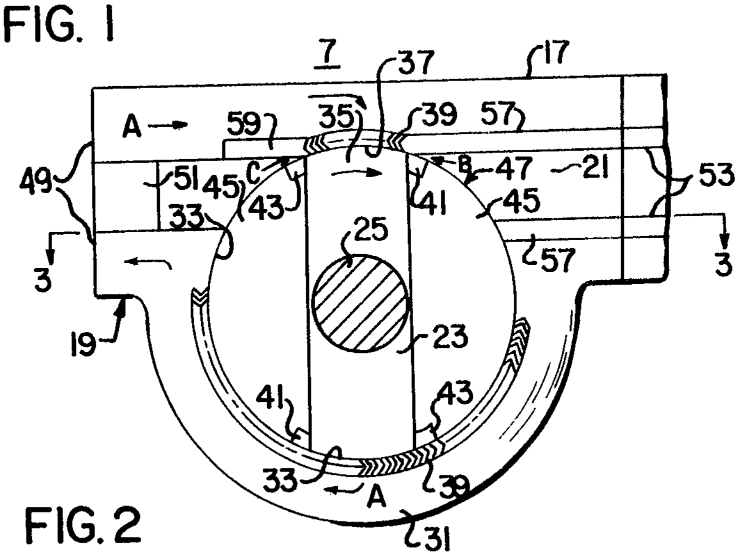
FIG. 2 is a sectional view through a switch used in the system of FIG. 1 and made in accordance with the teachings of the invention.
Figure 3:
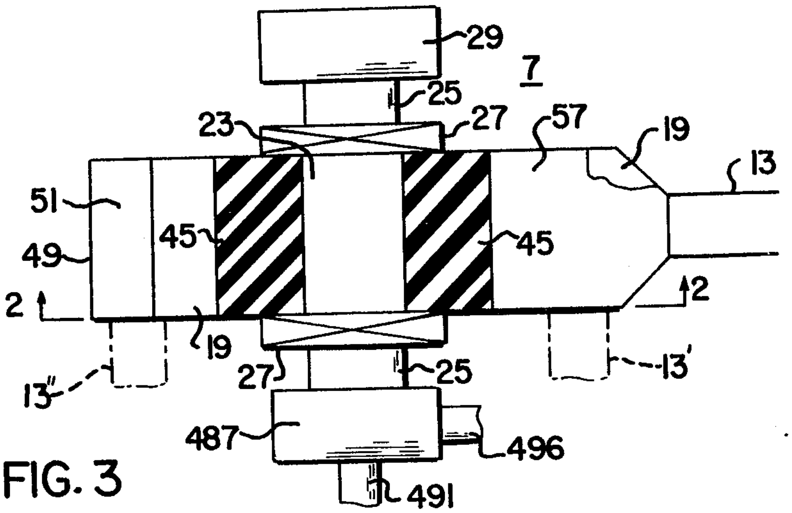
FIG. 3 is a section through the switch of FIG. 2 taken along the line 3—3.
Figure 4:
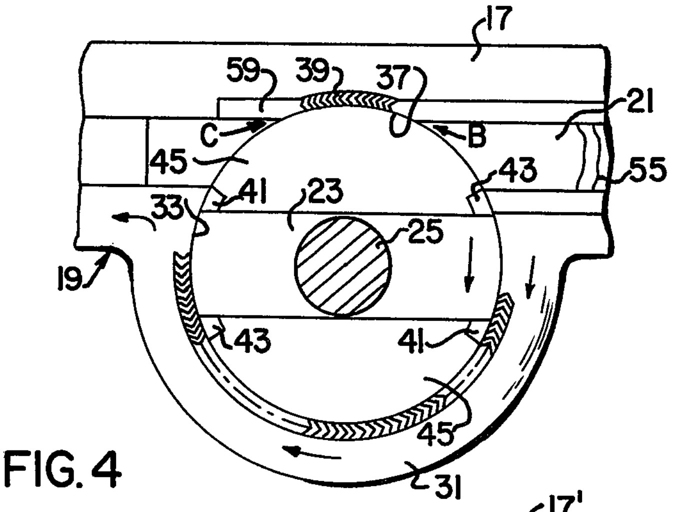
FIG. 4 is a section view similar to that of FIG. 2 with the armature in a second position.

One embodiment of the firing switch 7, which is shown schematically in FIG. 1, is shown in detail in FIGS. 2, 3 and 4. The switch 7 includes electrically conductive top and bottom rails 17 and 19, respectively, spaced apart in a common plane (parallel to the plane of FIGS. 2 and 4) by a gap 21. An electrically conductive armature 23, which is elongated in the direction of the common plane, is mounted on a shaft 25 for rotation in the common plane between the rails. The shaft 25 is supported by bearings 27 which may be of insulating material on both sides of the armature and is rotated by motor or other driving means 29. The bottom rail 19 has a section 31 which curves away from the upper rail 17 in the common plane to form an arcuate recess 33 which receives the armature 23. The recess 33 is of such a depth that with the armature rotated to a position parallel to the bottom rail 19, as shown in FIG. 4, it is spaced from the top rail by a width sufficient to give the required voltage withstand capability to prevent parasitic arc restrikes.

The arcuate ends 35 of the armature 23 are alternately in sliding electrical contact with the arcuate recess 33 in bottom rail 19 and an arcuate surface 37 on the upper rail as the armature is rotated. In order to reduce electrical contact resistance, the arcuate recess 33 and arcuate surface 37 are provided with multi-finger contacts 39. These contacts are in the form of sheets of resilient, electrically conductive material bent along an axis perpendicular to the common plane. As discussed below in connection with FIG. 5, these multi-finger contacts can alternatively be provided on the arcuate ends 35 of the armature 23 rather than on the arcuate recess 33 and arcuate surface 37.

The armature 23 is preferably provided with arc horns 41 and 43 extending circumferentially in the clockwise and counterclockwise directions, respectively, from the arcuate ends 35 of the armature. These arc horns, which are made of arc resistant material, provide contact surfaces for the arcs formed in the manner discussed below as the armature is rotated. If desired, electrically insulating sections 45 can be provided on either side of the armature 23 to form a cylindrical rotor 47. The first ends 49 of rails 17 and 19 are spaced by an insulator 51 while second ends 53 remain separated by the gap 21.

The very large current is applied to the switch 7 at the first ends 49 of rails 17 and 19 so that with the switch contacts shorted during charging of the inductor, the current flows, as indicated by the arrows A in FIG. 2, from the first end of one rail through the armature 23 and back to the first end of the other rail. The polarity of the current is not material.. When commutation is to commence, the armature 23 is accelerated clockwise, attaining maximum velocity after rotating about 45 degrees, at which point the rotating arc horn 43 passes the last few rows of contact fingers 39 on the upper rail and an arc is initiated between horn 43 and the adjacent rail structure in the vicinity of B. As can be seen, the arc is struck in the gap 21 between the rails on the outside of the loop formed by the flow of current at this time. This geometry combined with the high current level subjects the arc to enormous forces and the arc will, as a result, rapidly transfer from the rotating armature to the lower rail 19 and travel to the right, as illustrated in FIG. 4, toward the second ends 53 of the rails. The armature is then decelerated over the next roughly 45 degrees and, if desired, may be brought to a stop at the location shown in FIG. 4. In this figure, the location of the arc 55 is illustrative only, since commutation has surely gone to completion long before the armature reaches the position shown. For rapid fire, rotation of the armature is not stopped but continues in the clockwise direction until arc horn 41 comes in close proximity of the upper rail as at C and arc breakdown occurs to initiate switch reclosure. By continued rotation of the armature, bursts of current can be repetitively commutated into the rails 17 and 19 to the right of the armature as viewed in FIGS. 2 through 4. Although the arc moves rapidly along the rails, thereby minimizing damage, arc resistant inserts 57 made of materials such as silver tungsten of copper tungsten, for instance, can be provided in the confronting faces of the rails 17 and 19 where the arc is struck in order to prolong the life of the rails, especially under burst firing conditions. Another arc resistant insert 59 can be provided on the upper rail 17 in the area C where an arc is or may be struck upon closure of the switch.

As an example of the dimensions of a switch such as that shown in FIGS. 2 through 4, it will be assumed that the maximum current level to be commutated is 1.5 million amperes. It has been found that a sliding contect current density of 62.5 KA/in$^2$ (97 MA/m$^2$) is suitable for pulse current switching in the prior art rail switches. Utilizing this same current density for the multi-finger contacts 39 of the subject switch, it follows that 24 in$^2$ of total contact area is needed. By arbitrarily selecting a peripheral contact length of 4 inches for each end 35 of the armature 23, the length of the armature (the long dimension seen in FIG. 3) is 6 inches. Based on the angle subtended by the ends of the armature, the armature has a diameter (the long dimension in FIGS. 2 and 4) of about 12 inches and, being made of aluminum, has a weight of about 30 pounds. It is important to rapid commutation that the armature is moving at high speed when the circuit through the armature is interrupted. A peripheral velocity at arc start of about 165 ft./sec. (50 m/sec.) corresponds to the speed of the armature at arc initiation in the prior art rail switches. In the switch of FIG. 2, this occurs after about 45 degrees of clockwise rotation from the position shown. In the single shot mode, the armature must be brought to a stop in about another 45 degrees of rotation at the position shown in FIG. 4. The torque requirements for this acceleration and deceleration are well within the capabilities of reasonably sized components such as a suitable motor 29.

As can be seen from FIGS. 1 and 3, the rails 11 and 13 of the rail gun 9 are preferably longitudinally aligned with, or are longitudinal extensions of, the second ends 53 of the rails 17 and 19 of the firing switch. Since the armature 23 is extended along its rotational axis as discussed above to maintain the current densities in the sliding contacts 39 at reasonable levels, the second ends of the switch rails 17 and 19 are tapered as at 59 to direct the commutated current into the gun rails 11 and 13. Although there are decided advantages to this preferred arrangement which are discussed below in connection with arc driving of a projectile, the gun rails 11 and 13 can be connected to the switch rails 17 and 19 at any convenient point, such as illustrated by the rails 13' and 13'' shown in dashed lines in FIG. 3. Alternatively, if the switch is to be used not for a launching application but instead to commutate the massive current into a new circuit loop, 13' and 13'' can represent locations for the contacts to that loop. Furthermore, there is no requirement that the launcher rails be either parallel or perpendicular to the switch rails or even that they extend in a plane parallel to the plane of FIG. 3. Premature current flow into the launcher rails 11 and 13 can be controlled by utilizing current dividing resistance deliberately introduced into the breech area as described in my commonly owned patent application Ser. No. 185,705 filed Sept. 10, 1980 now U.S. Pat. No. 4,355,561 by resistive inserts in the gun rails, as described in my commonly owned patent application Ser. No. 185,706 filed Sept. 10, 1980 now U.S. Pat. No. 4,369,691, or by only inserting the projectile when firing is started, as suggested in my commonly owned patent application Ser. No. 100,302 filed Dec. 4, 1979 now U.S. Pat. No. 4,369,692.

Figure 5:
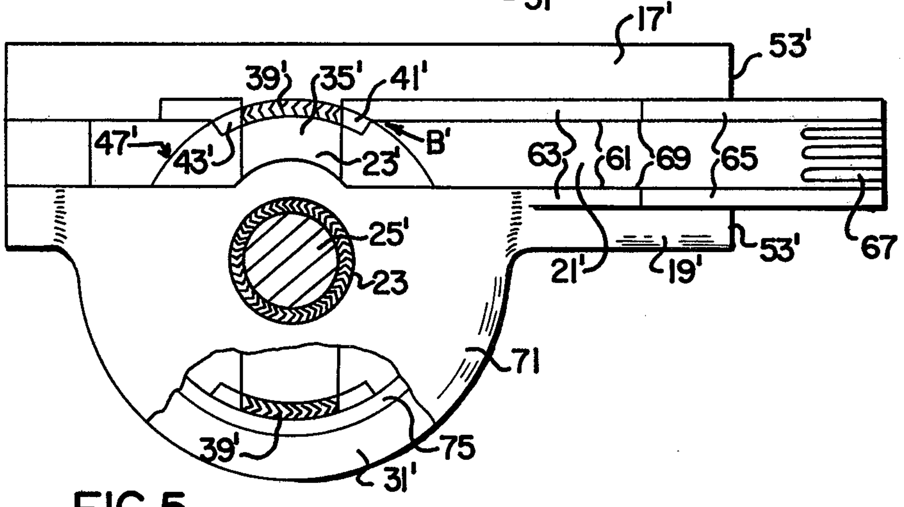
FIG. 5 is a sectional view through another embodiment of a switch made in accordance with the teachings of the invention.

The purpose of a commutating device or switch is to obtain a sufficiently high voltage across previously closed contacts or switch terminals so that current will be injected rapidly, or at a desired rate, into a new circuit. An additional requirement, especially for a rapid fire device, is minimum switch deterioration during the switching operation. FIG. 5 illustrates another embodiment of the subject firing switch which achieves these goals. There the arc is first accelerated in the initial rail gap 21' which has arc resistant conducting surfaces 61. In addition, the resistance per unit length of the rail can be made deliberately high by resistive inserts 63 so that, besides the voltage drops inherently produced when an arc is rapidly moved in a parallel rail gap, there will also be a substantial resistive voltage drop in the rails. This resistive drop should be kept at a reasonable level since, with too high a voltage drop per unit length, the total initial current may not flow through the rails, that is, an arc could parallel the rail surface and this could seriously damage the rails at their arc contacting areas. However, at the arc location where most of the current has been injected into the new circuit and the arcing current level is therefore significantly reduced, the conducting rail portions can terminate and be followed by insulated portions or inserts 65 and, if desired, by arc chute structures such as 67. The arc, at a much reduced current level, will then remain attached at locations 69 and will be lengthened and cooled in the insulating portions 65 and chute 67 so as to finally extinguish. Due to the lower current level, there should be little deterioration at the locations 69.

It will, in general, be undesirable to utilize a very long arc rail structure because (1) this greatly increases switch size and (2) would result in excessive inductive energy storage, and this energy is at least partially wasted during arc interruption. If the commutating voltage rises too rapidly resulting in excessive voltage before the arc horn 43' has moved far enough from the area B to withstand this voltage, then a restrike will occur which, though undesirable, is quite acceptable as the restruck arc will again be rapidly propelled into the parallel rail structure. The likelihood of arc restrike can be reduced by sweeping the surface of the rotor insulating sections 45' with a suitable gas, for example, $SF_6$, and this will also reduce the recession rate of the insulating surface.

Although FIG. 5 shows a gap 21' of uniform width, that is, the rails 17' and 19' are parallel, this is not necessarily the preferred arrangement. A wider or widening gap 21' in going to the right in FIG. 5 will increase arc length and provide more rapid cooling and arc elongation in a chute structure such as 67. Thus, a widening rail gap 21' will increase commutating voltage and generally yield earlier arc extinction.

The embodiment of the switch shown in FIG. 5 is especially useful in applications in which a very large current is to be interrupted rather than commutated into another circuit. In such a case there would be no launcher rails to be connected to the switch rails. Where, however, this switch is to be used as the firing switch in a rail gun system, the gun rails would not be longitudinal extensions of the second ends 53' of the switch rails, but could be connected to the switch rails at any other location as discussed above in connection with the switch of FIGS. 2 through 4.

The switch shown in FIG. 5 also incorporates modifications directed toward reducing local heating on the multi-finger contacts which carry the current passing between the armature and the rails of the switch. As shown in FIGS. 2 and 4, the multi-finger contact area between the armature 23 and the switch rails 17 and 19 covers a peripheral distance of about 4 inches. However, at the start of commutation, as the arc horn 43 passes progressively under the last few rows of fingers 39, substantially all the current will flow through this very small peripheral section of finger contacts and the same occurs at the opposite end of the upper contact area when, as best appreciated from FIG. 4, the arc horn 41 initially makes contact with the first few rows of finger contacts during switch reclosure.

Local finger contact area overheating and deterioration during switch breaking and making is prevented or alleviated in several ways in the switch of FIG. 5. First, the multi-finger contacts 39' are incorporated into the periphery 35' of the armature 23' instead of being stationary. Since the recess 31' assures that full contact is maintained at all times between the armature 23' and the lower rails 19', only the upper contact area is affected by current concentration. Thus, placing the multi-finger contacts 39' on the armature 23' results in a given set of fingers being subjected to current concentration only every second shot.

A second feature in the switch of FIG. 5 which reduces multi-finger contact heating is that electrical contact between the armature 23' and the lower rail 19' is made or is also made through the shaft 25' of the armature and side skirts 71 which cover the recessed section 31' of the lower rail 19'. Multi-finger contacts 73 extend completely around the shaft 25' and, since this peripheral distance can greatly exceed the peripheral distance on the end 35' of the armature 23', the current density through these contacts can be much reduced and is uniformly distribed. Furthermore, since there can be a gap 75 between the contacts 39' and the lower rail 19', no heating of these contacts need occur at all on alternate shots.

Another feature which may be used to reduce contact heating is to increase rotor length thereby decreasing current concentration. In addition, armature rotational velocity should be a maximum at break and make to reduce the time interval during which current concentration occurs in the multi-finger contacts. Also, the arc horn structures 41' and 43' can be made of resistive material so that some of the commutating voltage is attained earlier during armature rotation and therefore some of the current will have already been commutated and, in turn, current concentration or constriction is reduced during commutation. Likewise, during switch reclosure, a highly resistive arc horn structure 41' reduces the initial in-rush current level and, hence, current concentration for the reclosing operation. Finally, the fingers affected by current concentration, that is, the last few rows during commutation and the first few during reclosure, can be made of different material having higher temperature capability, or higher resistivity to reduce the current, or more mass to reduce temperature rise, or any combination of these.

During commutation, a massive arc is established in area B of the rotating switches of FIGS. 2 through 5 between the upper rail 17 and the arc horn 43 which is receding and thus lengthening the arc. The enormous forces propelling the arc at this point are quite likely to cause the arc roots on the armature 23 to move far faster than the armature surface speed in which case the arc roots may traverse the electrical contact area on the end 35 of the armature causing damage and excessive electrical contact drop during subsequent switch operation. This may be prevented, or the likelihood of such an occurrence may be reduced, as shown in FIG. 6, by so lengthening the arc horn 43'' that the end 35 of the armature cannot be contacted by the arc, or by narrowing the gap 21'' in the vicinity B'' by causing the rails 17'' and 19'' to converge in this area, or by making both of these modifications.

Figure 6:
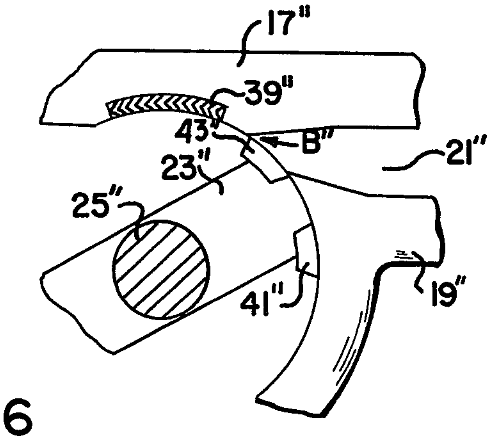
FIG. 6 is a sectional view showing a modification to a portion of the switches shown in FIGS. 2 or 5.

FIG. 6 also illustrates another modification to the rotary switch. Examination of the switch of FIGS. 2 through 4 shows that the peripheral surfaces of the rotor insulating sections 45 cover the multi-finger contacts 39 and thus help to protect these areas from contamination. On the other hand, these same surfaces can induce surface flashover and resultant restrike during commutation, as discussed above, because these insulating sections bridge the gap between the upper rail 17 and the arc horn 43. It is therefore quite feasible, and may be preferable, to eliminate the rotor insulating sections 45 as shown in FIG. 6 so that when the switch is open there is an open gap between the armature 23'' and the top rail 17''.

Figure 7:
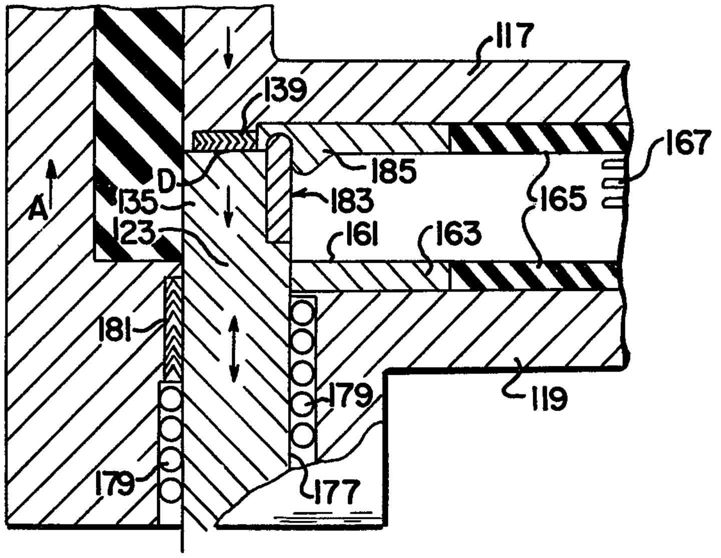
FIG. 7 is a sectional view through another embodiment of a switch made in accordance with the teachings of the invention.

FIGS. 2 through 6 illustrate rotary-type switches with a parallel rail structure to rapidly attain a high commutating voltage. FIG. 7 illustrates that the desired commutating performance and rapid reclosure for burst firing can also be attained utilizing a reciprocating shorting member in connection with a parallel rail structure.

As shown in FIG. 7, the switch includes parallel upper and lower rails 117 and 119 with a gap in between. The shorting member or armature 123 is a bar-like structure mounted in a hole 177 in the lower rail 119 for rectilinear movement in the common plane formed by the rails toward and away from the upper rail 117. The hole 177 leaves sufficient cross-section to the rail 119 so that the lower rail to the right in FIG. 7 remains continuously and solidly electrically shorted to the lower rail to the left of the armature. Bearings 179 guide and support the armature 123 against the large circuit induced forces which are generated by this configuration, especially in the closed position shown in FIG. 7. Downward movement of the armature 123 to open the switch is greatly augmented by these forces at high current levels. For the rapid reclosure associated with burst firing, the armature must be oscillated to return to the closed position in about 4 to 5 milliseconds. The required acceleration and deceleration may be obtained or aided, singly or in combination, by electromagnetic, mechanical, hydraulic, pneumatic, elastic impact, spring, explosive, shock absorber, or other means.

In the switch of FIG. 7, multi-finger contacts 139 are provided on the upper rail 117 where contact is made by the end 135 of the armature 123. Clearly, these contacts could alternatively be provided on the end 135 of the armature rather than in the rail structure. Additional multi-finger contacts 181 are provided in the walls of the hole 177 to complete the circuit between the armature and the lower rail. Alternatively or additionally, multi-finger contacts can be provided between the faces of the armature parallel to the plane of FIG. 7 and the lower rail.

In the rotating switch designs, the armature as illustrated can be rotationally accelerated over an angle of about 45 degrees before severe current concentration takes place in the brush contact area. By attaining a rather high surface velocity during this current concentration, for example, in the range of 25 to 50 m/sec. (82 to 164 ft./sec.), excessive overheating of the local contact members subjected to this current concentration is prevented or reduced because the time interval of current concentration is reduced. Similar current concentration takes place during rotary switch reclosure at the opposite edge of the multi-finger contact area and, again, rapid rotor surface movement reduces the likelihood of local contact area damage. Furthermore, for the rotating switch version, current concentration can additionally be reduced, as already disclosed, by utilizing resistive and possibly lengthened horn structures. Neither the high making and breaking velocity nor the resistive arc horn feature for preventing contact damage is as readily available for the FIG. 7 switch design. In order to prevent arc damage to both the smooth and opposite multi-finger contact areas, it is necessary to assure that contact is first interrupted at the left edge of contact area D and that the breaking of contact there progresses smoothly to the right until arcing commences between the moving arc horn structure 183 and the upper rail arc resistant structure 185. The reason all contact cannot be broken at the same time is that this would result in the likely generation of a massive arc or arcs which would, due to electromagnetic force, travel cross contact faces towards the right and would damage the contact areas. Progressive contact loss proceeding smoothly but rapidly from left to right can prevent all but very minor arcing but will result in very serious current concentration in the last few rows of multi-finger contacts. Damage in this area can be prevented, or at least reduced, by some of the measures listed above, such as by increased armature length (perpendicular to the plane of FIG. 7), or by using temperature resistant or high resistivity contacts in the last few rows. Progressive contact loss can be assured by having less compression of the multi-fingers at the left where contacts should part first and this can readily be attained by properly skewing the contact faces with respect to each other so that final contact is toward the right edge.

Arcing between contact area faces must also be prevented during reclosure and for this reason arc horn 183 and the rail structure 185 are so shaped as to assure that initially only these conducting members will approach closely to initiate arc breakdown and thus preclude or inhibit arcing on the contacting faces. Contact in the brush area will then proceed progressively from right to left, which is satisfactory. During reclosure, it is quite possible that upon first approaching an arc will initially strike and then move into the rail structure but arc restriking in the arc horn areas will occur again during closer approach and reclosure is then effected when multi-finger conducting contact is established.

The arc rail structure to the right of the armature in FIG. 7 can match that of the switch in FIG. 5. That is, the arc resistant section 185 on the upper rail and the resistive and arc resistant insert 161 on the lower rail can be followed by insulating inserts 165 or insulated bore and an arc chute 167. As with the rotary switches, the arc created during commutation is propelled by the large electromagnetic forces, down the rails to the right where it is elongated and cooled until it is extinguished. The lengths of the resistive and insulating sections in FIG. 7 have been shortened for purposes of illustration. As in the case of the rotary switches, launcher rails can be connected to the rails 117 and 119 at any desired point.

As was discussed previously, in the preferred arrangement when the subject switch is to be used in a rail gun or projectile launching system, the gun rails are longitudinally aligned with, or are longitudinal extensions of, the switch rails as shown in FIGS. 2 through 4. Thus, the arc which commutates the current into the gun rails is struck between these rails directly, or at least betwen extensions of them. While the rail surfaces along which the arc travels will eventually deteriorate, the projectile conducting armature (see FIG. 1) can be placed beyond this section of the rails so that good electrical contact can be maintained. To speed up commutation of the current into the projectile armature, the inserts 57 in FIG. 2 over which the arc travels can be made of resistive material with arc resistant surfaces, whereas the projectile armature current flows through the highly conductive rails backing up the inserts. In this arrangement, the highly conductive rails extend beyond the ends of the inserts 57 and the projectile armature contacts the rails directly.

Figure 8:
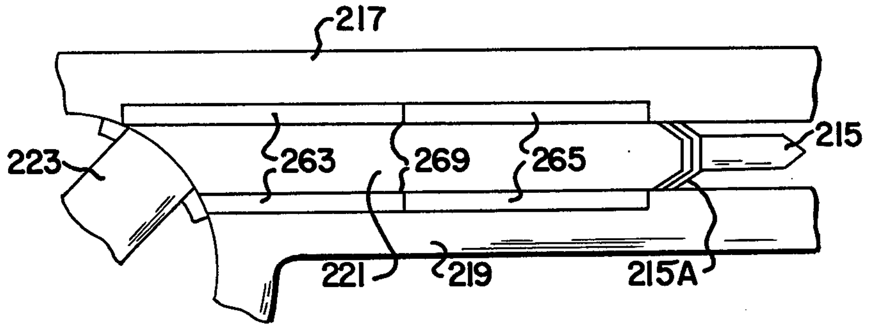
FIGS. 8 and 9 are sectional views through parts of rail gun assemblies incorporationg the invention.

For the just described configurations, the arc may be propelled so rapidly in the breech rail section that it may contact and deteriorate the rear of the conducting armature prior to all current being commutated into that armature. This can be prevented by two quite different embodiments, the first of which is illustrated in FIG. 8. Here the arc first travels between resistive inserts 263 in rails 217 and 219 so that a high commutating voltage is rapidly established, which will commutate a substantial fraction of the current to the conducting projectile armature 215A and thus initiate acceleration of the armature. The resistive insert length is next followed by an insulated rail portion or bore 265 which results in the commutating arc being elongated in that area with arc roots remaining attached at locations 269. The summation of resistive voltage drop in the region 263 plus the relaively high arc voltage in the region 265 assures, with proper length of the sections 263 and 265 that the arc will not impinge on the rear projectile armature face. Though in FIG. 8 and other figures the projectile 215 is shown being accelerated by an armature 215A, it should be understood that additional, but not shown, members of the projectile package may center, locate and guide the projectile in the bore, and may fall off after projectile exit.

Figure 9:
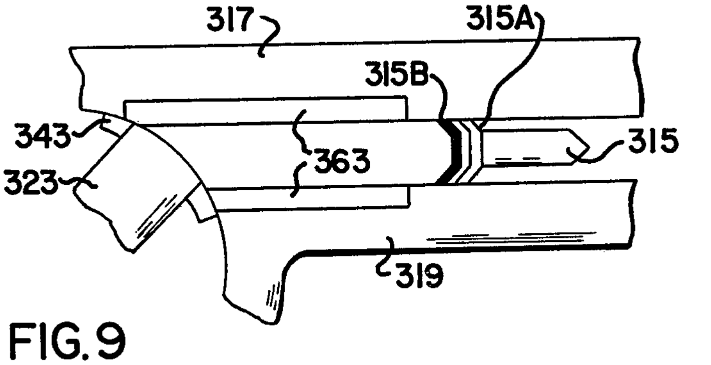

Another and preferred embodiment for preventing possible deterioration of the conducting armature by arc impingement and resultant heat damage to that conducting member is shown in FIG. 9. In this configuration, the rear face of the armature 315A is provided with a protective, insulating-ablating surface 315B, such as a sheet or coating of Teflon, neither of which adds extensive weight to the projectile assembly. Now when the arc impinges on the armature protective trailing face, no damage need be caused to the conducting armature and arc impingement can provide a propelling force on the projectile, thus improving overall efficiency of energy transfer to the projectile. In addition, as the commutating arc pushes the projectile, it is commutating current into the very closely spaced conducting armature 315A separated only by the insulating-ablating surface 315B. This means that the additional inductance into which current is being commutated is extremely low which, in turn, very dramatically simplifies and speeds up commutation. Also, since the arc is allowed to push the projectile armature, the initial projectile location can be closer to the switch armature 323 and this results in both a size reduction and an efficiency increase. It is to be understood that the term "arc" as used here is intended to include diffused contact of a conducting plasma with the rails, as well as localized rail contact.

If the projectile is at rest when contacted by the arc or plasma, the arc will be slowed down until the projectile can be accelerated, thus resulting in arc damage to the rails. An ideal propulsion configuration with the hybrid insulating-conducting projectile is attained when, at arc impingement on the rear insulating surface 315B, the projectile velocity is already sufficient to inhibit damage at the arc contact areas on the rails. This condition can be realized in the embodiment of FIG. 9 where the effect of resistive inserts 343 in switch armature 323 plus, if desired or needed, resistive portions 363 in rails 317 and 319, combine to yield a value of the integral of the commutating voltage multiplied by time, Vdt, sufficient to assure that enough current will have been commutated into the projectile armature 315A for a long enough period of time so that the armature will already have a velocity estimated to be on the order of 100 to 200 meters per second when impinged by the arc, that is, the arc resulting from the as yet uncommutated current. One obvious advantage of this configuration is that the arc is finally extinguished when commutation is completed, but before its extinction, the arc has aided in propelling the projectile and the efficiency of the energy transfer to the projectile is raised.

An entirely novel configuration is believed to result when the arc initiated during switch rotation or switch opening is deliberately propelled into a rail gap and this same arc then propels an insulating and sealing projectile located in that same set of rails, or an extension of these rails. If this is done naively, the rapidly traveling arc will contact the insulating projectile rear face and very extensive damage will occur at the arc to rail contact areas because the arc is temporarily forced to move at an excessively low velocity.

A massive arc current root or the root area of a very high current arc will, when traveling slowly over a conductor surface, overheat and then essentially explosively remove metal from that conductor surface in the arc root area. If the arc root travels quite rapidly, contact material loss can be substantially eliminated because none of the arc root area metal will be excessively overheated and vaporized or exploded away. The fact that massive arc roots moving at sufficiently high velocity cause little or no contact damage has been experimentally proven by arc propulsion of projectiles at Australian National University at current levels of up to 0.3 MA in the early 1970's, and for much longer duration testing by Westinghouse experiments with "Durarc" electrodes in the 1960's at currents to about 0.15 MA. For the purposes of this discussion, the arc velocity above which there is little or no contact area damage will be referred to as the threshold velocity.

The value of the threshold velocity is too difficult to determine analytically as it is a function of a large number of parameters which include: arc current magnitude, composition of the surrounding gas, ambient gas pressure and pressure in the arc zone, metal composition, arc root constriction, constriction heat generation in the metal, radiation heating by the arc, magnetic flux density, etc. Experimental determination of the threshold velocity is, on the other hand, quite feasible as arc velocity can be easily obtained, for example, photographically or by using flux actuated pickup coils. For the purposes of the discussion which follows, it will rather arbitrarily be assumed that the threshold velocity is 150 m/sec. (500 ft./sec.), which is a reasonable value.

Based on the above, satisfactory arc driving of the projectile without excessive rail damage will result if the arc is not slowed below the threshold velocity when it contacts the insulated projectile driving force. It is understood that the initial arc root velocity at the switch contact arc horns or at the start of the rail gap may be too low and damage or deterioration may occur there, but since these surfaces do not have to seal or guide the projectile, such deterioration, if not excessive, is acceptable. Furthermore, similar and again acceptable deterioration would also occur if the switch is used only to commutate current into a separate set of projectile rails, for example, the FIG. 5 configuration.

In the following discussion, means will be addressed which assure that the arc velocity is never slowed below the threshold value during acceleration of the gas sealing and insulating projectile. It should, however, be again pointed out that the actual value of that threshold velocity will have to be experimentally determined for each particular arc driving situation.

The most straightforward way for assuring the desired velocity of the projectile package when the arc contacts the insulating projectile is by gas pressure driving. For example, with a 0.3 kg (0.66 lbm) projectile package in a 2×2 inch (5×5 cm) bore, a gas pressure of 500 psi on the back of the projectile will cause the projectile to attain a velocity of about 150 m/sec. in 5 milliseconds, during which time the projectile will have travelled about 37 cm (14.6 in). If it is desired not to substantially waste 37 cm of travel length, this gas pressure accelerating distance can be decreased by raising the gas pressure. The pressure of 500 psi is actually quite moderate as electromagnetic pressures on the barrel rails and driving gas pressures on the sealing sabot face during arc driving are higher by between one and two orders of magnitude. If desired, some of the gas may be deliberately caused to flow through the arc during arc initiation to reduce deterioration of the surfaces which initially act as the arc root areas, such as the rotating arc horn.

Figure 10:
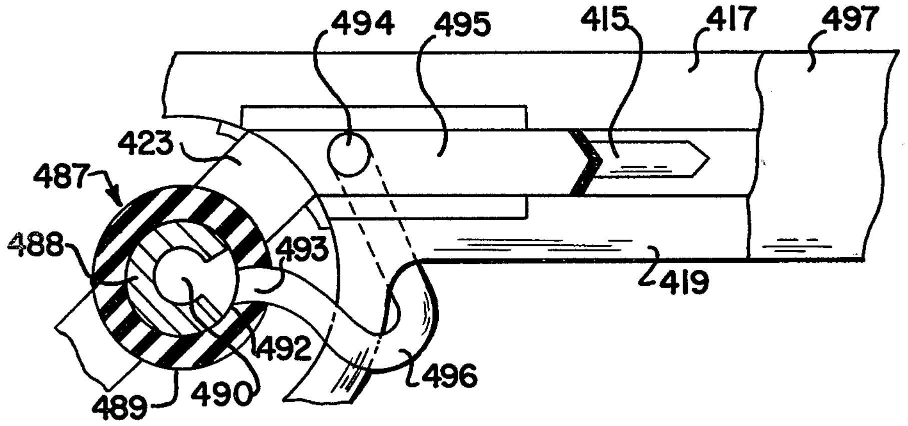
FIGS. 10 through 14 are views

An example of such an arrangement is shown in FIG. 10 wherein the valve 487 which controls flow of the projectile driving gas, for example nitrogen, is mounted on the end of the armature shaft 25 (see FIG. 3). The valve includes a valving member 488 which is rotated by the shaft 25 inside a housing 489 and is provided with axial inlet 490 to which a supply line not shown, is connected. A radially extending cavity 492 in the valving member 488 provides communication between the inlet 490 and a passage 493 in the housing as the armature 423 is rotated. The passage 493 is connected to an inlet 494 in an insulating side wall 495 of the rail gun by a hose 496. The near sides of the rails and switch in FIG. 10 are also enclosed by an insulating side wall 497 to form an airtight chamber. Expansion of the gas in this chamber drives the projectile 415, which only has an insulating-ablating rear portion that also serves as a gas seal, down the rails 417 and 419. The radial cavity 492 is dimensioned such that gas is introduced into the airtight chamber behind the projectile 415 as the armature 423 begins to rotate so that the projectile will reach the threshold velocity by the time that the driving arc catches up with it. Since the projectile 415 has no conducting armature, the arc will not be extinguished but will drive the projectile down the rails at a very high velocity.

Instead of providing gas pressure from a reservoir or accumulator, gas pressure may also be generated by chemical combustion means, for example, by use of conventional explosives or by initiating combustion in a combustible gas mixture, with the initiation of combustion synchronized with the firing sequence.

Figure 11:
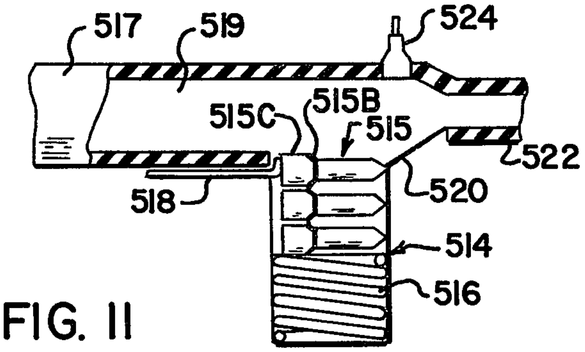

FIG. 11, which is a horizontal section, shows that projectiles 515 with caseless explosive charges 515C secured behind the insulating gas seal 515B can be fed between the gun rails by a conventional type of magazine 514. A spring 516 in the magazine biases the projectiles toward the breech of the rail gun. An actuator 518 pushes the projectiles 515 along a camming surface 520 and into the gap between the rails. The actuator 518 also closes the opening through which the projectiles are inserted to form, together with the rails and side walls 522, a gas tight chamber. The caseless explosive is ignited by a spark from igniter 524 which is synchronized with the rotation of the switch armature. If a combustible gas is used, it can be metered into the gun bore by the arrangement of FIG. 10 and ignited by an igniter such as that shown in FIG. 11.

Figure 12:
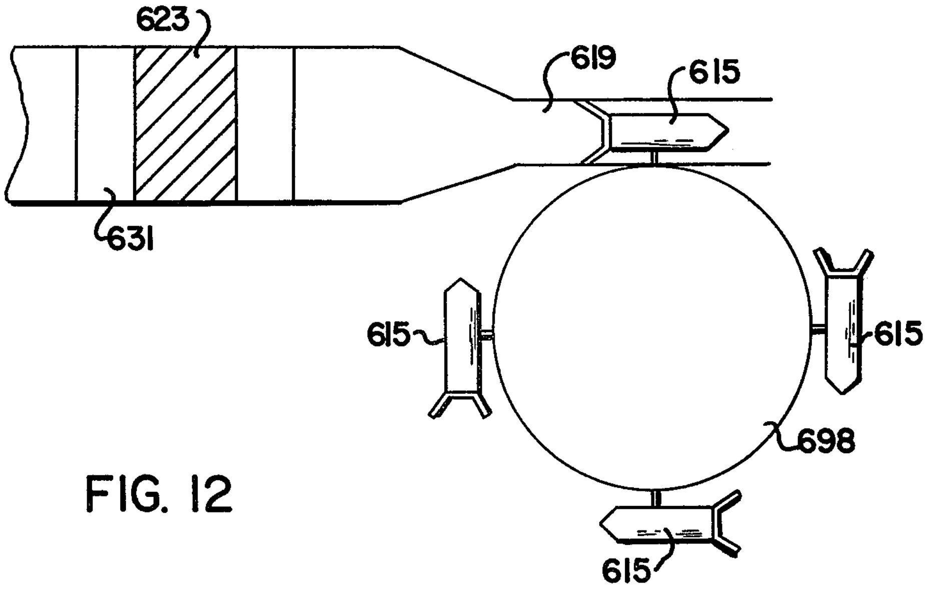

As an alternative to using gas pressure to accelerate the projectile, it is also possible to introduce the projectile directly into the rail system at the desired initial velocity utilizing mechanical means. For example, as shown in FIG. 12, which is a horizontal section through a rail gun assembly, successive insulating projectiles 615 can be mounted on the periphery of a wheel 698 which is rotated (by conventional means not shown) at a peripheral speed equal to the threshold velocity. Rotation of the armature 623 is synchronized with the rotation of the wheel so that the arc catches up with the projectile as it is inserted between the rails at about the threshold velocity. Such an arrangement is particularly useful in burst firing of the rail gun. Of course, means could be provided to reload the wheel with projectiles as it is turning for extended burst firing.

Figure 13:
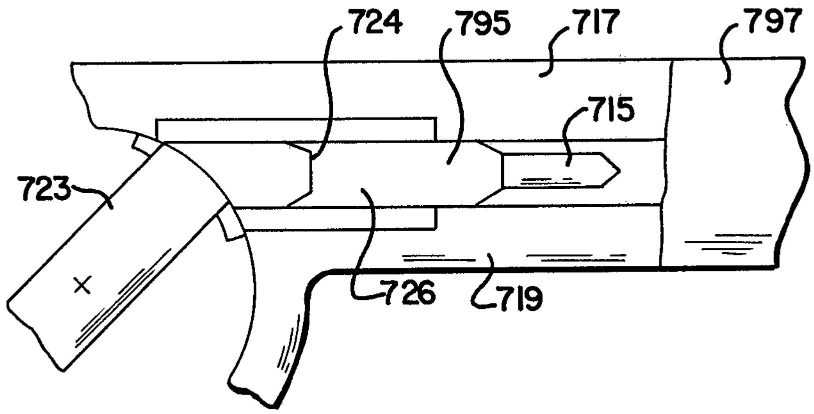

If the projectile package were essentially weightless, then the gas pressure increase due to heat released by the arc and any pressures ahead of the arc and produced by the moving arc may be sufficient so that at arc impingement, the near weightless projectile package will already have attained or exceeded the threshold velocity. Obviously, there is little use to accelerating a weightless projectile, but the just described performance can be approximated by placing a very light, insulating, gas sealing member an optimum distance to the rear of the projectile package. Such an arrangement is shown in FIG. 13 where an enclosed gun bore is formed by the rails 717 and 719 and side insulating panels 795 and 797. An auxiliary sliding member or diaphragm 724, such as a disk or block of Teflon$^{TM}$, placed in the gun bore between the armature and the insulating projectile 715 forms an airtight chamber 726 behind the projectile. The auxiliary sliding member 724, being very light, is accelerated to sufficient speed by the gases in front of the arc struck by the rotating armature 723 so as not to excessively reduce arc velocity, and gas pressure increase in the gas trapped in chamber 726 then accelerates the projectile so that the arc is not thereafter excessively slowed down. The auxiliary member 724 in this configuration is also the ablating insulation and, therefore, the projectile 715 can be composed of insulating but not necessarily heat resistant materials. The auxiliary member 724 can easily be inserted into the rail gap through a sealable port in a side wall as is the projectile.

Figure 14:
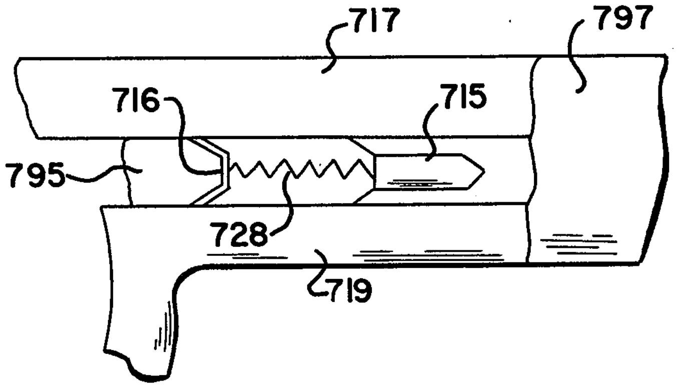

Instead of relying on only the gas pressure buildup betwen the sealing auxiliary member 724 and the also sealing projectile package 715 for providing the initial acceleration of the projectile package as shown in FIG. 13, such transmission of accelerating force on the projectile may also be aided or be produced entirely by having a collapsible structure 728 between these members, as shown in FIG. 14, and the collapsing then exerts the required force progressively on the projectile assembly.

As already pointed out, arc driving of projectiles eliminates the need for a rather heavy conducting and driving armature thus yielding greater payload capability. Additional advantages of arc driving are: (1) that there can be no premature current flow during charging of the inductor thus eliminating the need for means to control or prevent such current flow and (2) that the insulating and sealing projectile package can be placed into the rail gap prior to the rail inductive energy being dissipated, thus allowing a faster reloading sequence.

While several specific embodiments of the invention have been described in detail, it will be appreciated by those skilled in the art that additional modifications and alternatives to those details could be developed in light of the overall teachings of the disclosure. Accordingly, the particular arrangements disclosed are meant to be illustrative only and not limiting as to the scope of the invention which is to be given the full breadth of the appended claims and any and all equivalents thereof.

It should be understood that due to the high currents conducted in the various switch and launcher rail configurations, high separating forces will be generated and these have to be restrained but insulated by conventional clamping means which have not been illustrated. Likewise, the conducting members of the launcher bore and the switch configurations must also be separated by insulating members so that arcs are confined as needed, for example, in launcher bores to prevent leapfrogging or bypassing of the driving arc beyond the projectile or in switches to prevent arcing at any undesired location where the arc would not be propelled properly into the switch rails.

I claim:

1. A switch for switching a DC current comprising:
   a pair of electrically conductive rails extending in generally the same direction in a common plane with a gap therebetween;
   an elongated armature;
   means for mounting said elongated armature for rectilinear movement in said common plane from a first position in which the armature bridges said gap and is in electrical contact with both of said rails to conduct between the rails a current applied to the rails at one end thereof, and a second position in which electrical contact between at least one rail and the armature is broken to interrupt the flow of current through the armature and to inject into the gap between the rails, for travel along the rails toward the second ends thereof, an arc created as contact between said armature and said one rail is broken;
   wherein said armature is provided on a free end, which makes and breaks contact with said one rail, with an arc horn at the edge of said armature adjacent the second end of said rails, and wherein resilient electrical contacts are provided between the one rail and said free end of the armature which break electrical contact between said one rail and said free end of the armature progressively along said free end from a point remote from the arc horn toward the arc horn; and
   wherein said other rail defines a recess in which said armature is mounted with said armature in electrical contact with at least one wall of said recess.

2. The switch of claim 1 with an arc horn structure so located that any arcing generating during switch opening and closure will cause the arcs to be moved into the switch rail gap and away from the contact faces of the one rail and the armature.

3. A projectile launching assembly comprising:
   a first pair of generally parallel electrically conductive rails mounted in spaced parallel relationship in a common plane with a gap therebetween;
   means for generating a DC current connected to one end of said first rails;
   a switch comprising:
   an elongated armature, and
   means for mounting said elongated armature for rectilinear movement in said common plane from a first position in which the armature bridges said gap and is in electrical contact with both of said first pair of rails to conduct between said first pair of rails a current applied to the first pair of rails at one end thereof, and a second position in which electrical contact between at least one of said first pair of rails and said armature is broken to interrupt the flow of current through the armature and to inject into the gap, for travel along the first pair of rails toward the second ends thereof, an arc created as contact between said armature and one of said first pair of rails is broken, wherein the other rail defines a recess in which said armature is mounted with said armature in electrical contact with at least one wall of said recess;

a second set of parallel launcher rails with a first end of each rail of said second set connected to one of the rails of said first set;

a projectile placed between and in sliding contact with each of said second pair of rails, said projectile being accelerated toward and ejected from the second ends of said second set of rails when said armature is moved to interrupt the flow of current therethrough; and wherein said armature is provided on a free end, which makes and breaks contact with said one rail, with an arc horn, and wherein resilient electrical contacts are provided between said one rail of said first pair of rails and said free end of the armature, which break electrical contact between said one rail and said free end of the armature progressively along said free end from a point remote from the arc horn toward the arc horn.

4. The projectile launching assembly of claim 3, further comprising:

a resistive insert on at least one of said first set of rails adjacent to said elongated armature, whereby commutation of said current into said second set of rails is accelerated.

5. A switch for switching a DC current comprising:

a pair of electrically conductive rails extending in generally the same direction in a common plane with a gap therebetween;

an elongated armature;

means for mounting said elongated armature for movement from a first position in which the armature bridges said gap and is in electrical contact with both rails to conduct between the rails a current applied to the rails at one end thereof, and a second position in which electrical contact between at least one rail and the armature is broken to interrupt the flow of current through the armature and to inject into the gap between the rails, for travel along the rails toward the second ends thereof, an arc created as the flow of current through the armature is interrupted; and wherein said armature is elongated in a direction in the common plane and wherein said mounting means mounts said elongated armature in the gap between the rails for rotation in said common plane, the armature ends being arcuate and the one rail being provided with a complementary arcuate surface against which the armature rotates with one arcuate end of said armature in sliding electrical contact with said complementary arcuate surface when said armature is rotated to said first position.

6. The switch of claim 1 wherein neither end of said armature makes contact with said complementary arcuate surface when said armature is rotated to the second position.

7. The switch of claim 5 wherein the other rail includes an arcuate section curved in said common plane away from said one rail to define an arcuate recess for receiving the armature, said recess being of a depth such that with the armature rotated to a position generally parallel to said other rail, said armature is spaced from the one rail by a distance sufficient to prevent parasitic arc restriking during the switching operation.

8. The switch of claim 7 wherein said arcuate recess in the other rail has an arcuate surface complementary to the arcuate ends of said armature and wherein one arcuate end of the armature is always in sliding electrical contact with said arcuate recess surface.

9. The switch of claim 7 wherein said armature has a shaft with which it is mounted for rotation in said common plane and wherein said armature is in continuous electrical contact with said other rail through said shaft.

10. The switch of claim 5 including arc horns comprised of arc resistant material extending in a circumferential direction from the arcuate ends of the elongated armature, wherein the trailing arc horn as the armature is rotated from said first to second positions is of sufficient length to temporarily bridge the gap between the rails so that as the end of the trailing arc horn separates from electrical contact with the one rail and the arc is struck between the one rail and the trailing arc horn and is driven down the gap between the rails, the roots of the arc pass only over the arc horn surface and not the end of said armature in reaching the other rail.

11. A projectile launching assembly comprising:

a first pair of generally parallel electrically conductive rails mounted in spaced parallel relationship in a common plane with a gap therebetween;

means for generating a DC current connected to one end of said first rails;

a switch comprising:

an elongated armature, and means for mounting said elongated armature for movement from a first position in which the armature bridges said gap and is in electrical contact with both said first rails to conduct between the first rails said DC current, and a second position in which electrical contact between at least one said first rails and the armature is broken to interrupt the flow of current through the armature and thereby generate an arc which travels along the first rails toward the second ends thereof, wherein said armature is elongated in a direction in the common plane and wherein said mounting means mounts said elongated armature in the gap between the first pair of rails for rotation in said common plane, the armature ends being arcuate and one of said first pair of rails being provided with a complementary arcuate surface against which the armature rotates with one arcuate end of said armature in sliding electrical contact with said complementary arcuate surface when said armature is rotated to said first position; and a second set of parallel launcher rails with a first end of each rail of said second set connected to one of said rails of the first set, and a projectile placed between and in sliding contact with each of said second rails, said projectile being accelerated toward and ejected from the second ends of said second set of launcher rails when said armature is rotated to interrupt the flow of current therethrough.

12. The projectile launching system of claim 11 wherein the rails of said second set are longitudinal extensions of the rails of said first set.

13. The projectile launching system of claim 11 including resistive inserts on confronting faces of said rails adjacent the armature whereby commutation of said current into the launcher rails is accelerated.

14. The projectile launching system of claim 13 including insulating inserts in confronting faces of the rails adjacent the resistive sections to elongate the arc between the rails and to extinguish the same and thereby commutate the DC current more rapidly into the launcher rails.

15. The projectile launching system of claim 11 wherein said projectile includes electrically conductive means and has a rear face having a surface which protects the projectile from the arc, said projectile being inserted between the launcher rails at a point where the arc struck between the rails catches up with said projectile during its initial acceleration to further accelerate the projectile before the arc is extinguished.

16. The projectile launching system of claim 11 wherein said projectile is electrically nonconductive and is driven toward and out of the second ends of the launcher rails by said arc.

17. The projectile launching system of claim 16 including additional means for providing initial acceleration to said projectile, such that said projectile is already moving when contacted by the arc and the arc is not slowed down enough thereby to cause significant damage to the rails.

18. The projectile launching system of claim 17 wherein said accelerating means includes means for injecting a fluid to apply a pressure which accelerates the projectile and means for synchronizing the injection of said fluid with the interruption of the current through the armature.

19. The projectile launching system of claim 17 wherein said accelerating means includes a diaphragm in sliding and sealing contact with the rails between the armature and the projectile and a gas in the space between the diaphragm and projectile, said diaphragm being driven toward the projectile by said arc to compress said gas and initiate through the compressed gas initial acceleration of said projectile.

20. The projectile launching system of claim 17 wherein said accelerating means includes a diaphragm in sliding and sealing contact with the rails between the projectile and the armature and a collapsible member between the diaphragm and the projectile, said diaphragm being accelerated by the approaching arc and transmitting through said collapsible member a force which provides initial acceleration to the projectile.

21. The projectile launching system of claim 17 wherein said accelerating means includes means which insert said projectile into the gap between the rails with an initial velocity toward the second ends of the rails, and means for synchronizing the insertion of said projectiles into the gap with the interruption of current through the armature such that said arc catches up with and accelerates said projectile.

22. The projectile launching system of claim 21 wherein said insertion means includes a wheel rotating in a plane transverse to the plane of said rails with the periphery thereof, upon which the projectile is carried tangent to the gap between the rails such that the projectile is inserted into the rail gap with the peripheral velocity of said wheel.

23. The projectile launching system of claim 17 wherein said accelerating means includes means for injecting a combustible fluid behind said projectile, means for igniting said combustible fluid to apply a pressure which accelerates the projectile, and means for synchronizing the activation of said igniting means with the interruption of said current through the armature.

24. The projectile launching system of claim 11 wherein said projectile comprises: a body portion, an electrically conductive armature extending across the body portion for conducting a large current therethrough transverse to the longitudinal axis of the projectile, and ablating, heat-resistant means secured to the rear face of said projectile.

* * * * *